US006206993B1

(12) United States Patent
Kiest, Jr. et al.

(10) Patent No.: US 6,206,993 B1
(45) Date of Patent: Mar. 27, 2001

(54) METHOD AND APPARATUS FOR PROVIDING A TUBULAR MATERIAL WITHIN A PIPELINE

(75) Inventors: Larry W. Kiest, Jr., Ottawa; Gary VanAmeyde, Tinley Park, both of IL (US)

(73) Assignee: LMK Enterprises, Inc., Ottawa, IL (US)

( * ) Notice: Subject to any disclaimer, the term of this patent is extended or adjusted under 35 U.S.C. 154(b) by 0 days.

(21) Appl. No.: 09/224,156

(22) Filed: Dec. 31, 1998

Related U.S. Application Data

(62) Division of application No. 08/708,055, filed on Aug. 30, 1996, now Pat. No. 5,855,729, which is a continuation of application No. 08/293,697, filed on Aug. 19, 1994, now abandoned.

(51) Int. Cl.[7] ................................................... B29C 63/36
(52) U.S. Cl. .......................... 156/156; 156/287; 156/294; 264/269; 264/573
(58) Field of Search ..................................... 156/156, 287, 156/294; 138/97, 98; 264/269, 270, 573

(56) References Cited

U.S. PATENT DOCUMENTS

| 4,064,211 | * | 12/1977 | Wood ........................................ 264/95 |
| 4,207,130 | * | 6/1980 | Barber ................................. 156/244.13 |
| 5,044,405 | * | 9/1991 | Driver et al. ............................. 138/98 |
| 5,388,616 | * | 2/1995 | Muller et al. ............................ 138/98 |

* cited by examiner

Primary Examiner—Michael W. Ball
Assistant Examiner—Gladys Piazza
(74) Attorney, Agent, or Firm—Vedder, Price, Kaufman & Kammolz

(57) ABSTRACT

An apparatus for inserting a lining material into a pipeline includes an elongated carrier device having a hollow central portion which encloses a liner-bladder assembly. The liner-bladder assembly includes an elongated inflation bladder which engages an open end of the carrier device and expands under fluid pressure out of the carrier device. The pipe liner is frangibly attached to the inflation bladder such that its attachment anchors the liner with respect to the open end of the carrier device to permit accurate placement of the liner within a pipeline proximate to a compromised section of the pipeline. The frangible connection breaks when the carrier device and inflation bladder are removed from the pipeline.

16 Claims, 3 Drawing Sheets

METHOD AND APPARATUS FOR PROVIDING A TUBULAR MATERIAL WITHIN A PIPELINE

REFERENCE TO RELATED APPLICATION

This application is a divisional application of prior application Ser. No. 08/708,055, filed Aug. 30, 1996 now U.S. Pat. No. 5,855,729 which is a continuation of prior application Ser. No. 08/293,697, filed Aug. 19, 1994 abandoned.

BACKGROUND AND SUMMARY OF THE INVENTION

The present invention relates generally to the lining of pipes with a tubular material and, more particularly to the relining of a particular portion of a pipe.

The most common underground pipeline is a sewer pipe which conveys wastewater from residences and industry through a wastewater collection system to a wastewater treatment facility. Sewers are often buried underground and located underneath streets and roadways. Portions of the sewer system may become cracked or broken over time due a number of factors. Shifting of the earth, secondary surface loadings and weather conditions are examples of external factors which may affect the integrity of sewer pipes as well as other subterranean pipes. These external factors may result in broken pipe sections which compromise the ability and effectiveness of the sewer system to accomplish its collection and conveyance functions of wastewater.

Apart from the external factors set forth above, sewers and other pipelines may also have their effectiveness compromised by internal factors. For example, the inner surface of a sewer pipe may become eroded or roughened from continuous contact with wastewater and abrasive material suspended therein. Erosion of the interior surfaces of any fluid-conveying pipe results in an increase in the pipe's roughness coefficient. This coefficient is a measure of the resistance to fluid flow by the pipe. The greater the roughness coefficient, the greater the head loss experience by fluid passing through the pipe. Eroded pipes therefore make it more difficult to convey wastewater than pipes as originally designed and installed. This problem may be cured by relining or replacing the sewer pipe. Sewer pipes need to be replaced or relined on a regular schedule in order to reclaim the original design parameters of the sewer system.

It is known in the art that the above problems may be effectively cured by replacement or repair of the compromised portion of sewer pipe. Excavation of the area surrounding the sewer pipe and replacement of the broken portions is one solution, but it is a very expensive and labor intensive solution. This type of repair is also an inconvenience to residents living in the area and utilizing those roadways overlying the compromised area.

Another solution which is less expensive in labor and intensive is in situ relining of the sewer pipes. In situ relining methods typically utilize a resin-coated liner which is inserted into the existing sewer pipeline and unrolled against the sewer pipe. The unrolled liner is held against the existing sewer pipe while the resin cures to form a new pipe lining within the existing pipe which provides a new and relatively smooth interior surface having a low roughness coefficient which rivals or better than that of the original sewer pipe. These type liners also protect the existing pipe from attack by many chemicals found in wastewater fluid and reinforces the existing pipe to existing subterranean external loads imposed upon the pipes. These relining methods are well described in the patent literature.

One such relining method is described in U.S. Pat. No. 4,876,921 and utilizes a plastic liner known as the NuPipe®. The NuPipe® liner is an extruded thermoplastic sleeve which is heated to soften the liner and pulled through the sewer pipe. A rounding device is then propelled through the plastic liner to force the liner outwardly against the existing pipeline. This type of relining process is costly and the liner does not expand to a significantly large degree so that the installer needs to have a variety of different diameter liners on hand as inventory to effectively match the inner diameters of existing pipes.

Other methods described in the patent literature include the use of a woven textile liner laminated with multiple resin coatings. This type of liner and its method of installation of this type liner are described in U.S. Pat. No. 4,600,615, which issued Jul. 15, 1996, which discloses a pipe relining material consisting of a woven, air-impervious textile jacket which has an outer resin coating consisting of multiple polyester resin layers laminated to each other. These woven liners are inserted into an existing sever pipe and inflated against the existing sewer pipe walls by fluid pressure. Because of their woven construction, these lines do not significantly expand against the existing pipe walls and therefore the installer needs to carry a large amount on inventory on hand to fit the diameter of the pipe being repaired.

The patents identified above all describe liners which are commonly installed in pipes and extend from one accessway, or manhole, to another accessway. The length of the subterranean pipeline between these opposing accessways may range anywhere from 50 to 500 feet. Quite often, in such a large extent of pipe only one particular section of the pipe is compromised and needs to be relined. The prior art does not suggest an effective means of spot repair, i.e., repairing only the compromised section of the pipe, but rather suggests either relining the entire length of the sewer pipe or relining the sewer pipe from the nearest accessway to the compromised pipe section. Either of these two approaches results in an increased repair cost and usage of more relining material than is necessary.

The present invention therefore concerns itself with an apparatus and a method for reliably performing such spot repairs, in which only the compromised pipe section is repaired. The present invention represents a significant advancement over the prior art in that it permits the insertion into the existing pipe of a preselected length of a new pipe lining material and conveyed through the pipe until the lining material is located adjacent the compromised section pipe. The lining material is subsequently contacted against the inner surface of the existing pipe to form a new lining at the compromised pipe section only. By reliably locating the new liner material proximate to the compromised section and retaining it in place while the new lining material is cured in place, the present invention significantly reduces the expense and time and labor required to perform such spot repairs. Additionally, the present invention provides for the introduction into an existing pipeline of a pipe lining material which is impregnated with resin in a "clean" fashion, in which the risk of either contamination of the resin or contact between the resin-impregnated liner and the existing pipe or the individuals installing same is substantially eliminated. It further allows for accurate positioning of the new lining material at the compromised pipe section.

In accordance with one principal aspect of the present invention, a new pipe lining material is impregnated with a curable resin and is held in place within a carrier which conveys the resin-impregnated lining material to the compromised pipe section without contacting the walls of the existing pipe which might remove resin therefrom during positioning of the lining material within the pipe. A flexible envelope, or inflation bladder, which forms an extension of the carrier and provides a support for the lining material during installation when the lining material is everted out of the carrier. This flexible envelope expands radially under fluid pressure as it everts axially out of the carrier and into contact with the pipe wall inner surface.

In another principal aspect of the present invention, the lining material is attached to the inflation bladder by means of a frangible connection which fixes the position of the lining material with respect to the carrier the compromised pipe section. This frangible connection has a strength sufficient to withstand the eversion of the lining material out of the launching device, yet is weak enough to break after the lining material has cured and the carrier is removed from the pipe. This frangible connection permits the flexible envelope to anchor the tubular lining in position during installation and support it in place within the compromised pipe section during curing.

In accordance with yet another principal aspect of the present invention, the flexible envelope is inverted in the carrier during insertion of the carrier into the existing pipeline and the envelope is formed from a urethane-coated scrim which is capable of limited expansion under pressure against the pipe wall.

In still yet another principal aspect of the present invention, the carrier includes an endcap having means for positioning the carrier within the pipe, fluid entrance and exit means and an inflation bladder stop means. The carrier has an open eversion end which includes a collar which engages the flexible envelope and a plurality of flexible cover members, in the form of flaps which form a flexible cover portion over the collar to protect the attachment between the inflation bladder and the carrier and to assist the carrier to negotiate bends and other internal configurations of the existing pipe.

Accordingly, it is an object of the present invention to provide an improved apparatus and method for the relining of pipes.

It is another object of the present invention to provide an apparatus for the insertion and installation of a new liner into an existing pipe which is particularly suitable for the spot repair of compromised sections of a given pipeline, wherein the liner is introduced into the existing pipe by means of a carrier which encloses the liner and protects it from contact with the surrounding pipe walls until the liner is in its desired location within the existing pipe.

It is still a further object of the present invention to provide a method for the relining of subterranean pipes in which a pipe liner is secured to an inflation bladder, coated with resin and encapsulated within a positioning element, the positioning element then being inserted into an existing pipe and fluid being introduced under pressure into the positioning element to cause the inflation bladder and the liner secured thereto to evert outwardly from within the positioning element into a placement position near the compromised pipe section, the inflation bladder expanding radially in response to the fluid pressure and urging the liner into contact against the pipe wall, and subsequently removing the inflation bladder and positioning element from the pipe.

It is still yet a further object of the present invention to provide a method for the relining of pipes in which a resin-coated liner is introduced into an existing pipe and cured in place, the method including the steps of forming a liner-bladder assembly in which a pipe liner is anchored on a inflatable bladder by frangibly attaching the liner to the inflatable bladder, the liner being impregnated coated with a curable resin; the liner-bladder assembly being enclosed within an elongated carrier element; the carrier element being introduced into the pipeline; an inflating medium being introduced into the carrier element under pressure to cause the bladder-liner assembly to evert out of the carrier element into the compromised pipe section, and thereby to further cause the inflatable bladder and liner to expand radially within the pipe into contact with the inner surface of the pipe wall; the resin being allowed to cure so as to form a solid new pipe lining within the existing pipe; and, the carrier element and bladder being subsequently withdrawn from the pipe, leaving the cured liner in place within the pipe.

Yet another object of the present invention is to provide novel inflation envelope for use in the installation of lining materials in pipelines, the inflation envelope having opposed sealed and open ends adapted for engagement to an insertion member, the inflation envelope being formed from a flexible polymeric material into an elongated tube, the inflation envelope further having means for frangibly anchoring a portion of the liner to the inflation envelope.

A still further object of the present invention is to provide an apparatus for installing a new liner within an existing pipeline comprising an elongated, flexible lining material support means, an elongated liner positioning means, the support means being interconnected to the liner positioning means at an open end thereof so as to permit the support means to be inverted into and everted out of the liner positioning means, the liner positioning means further having a plurality of protective cover members disposed near its open end which protect the support means within the liner positioning means during insertion of the liner positioning means into the pipe, the liner positioning means further having means for limiting the eversion of the support means out of the liner positioning means, the support means further having frangible attachment means adapted to provide a frangible connection between the support means and the pipe liner to hold the liner in place during installation yet separate during removal of the launching means from the pipe while leaving the new liner in place within the pipe.

These and other objects, features and advantages of the present invention will be apparent through a reading of the following detailed description, taken in conjunction with accompanying drawings, wherein like reference numerals refer to like parts.

BRIEF DESCRIPTION OF THE DRAWINGS

In the course of the description, reference will be made to the attached drawings in which.

DESCRIPTION OF THE PREFERRED EMBODIMENTS

The Liner Installation Apparatus

Figure 1:
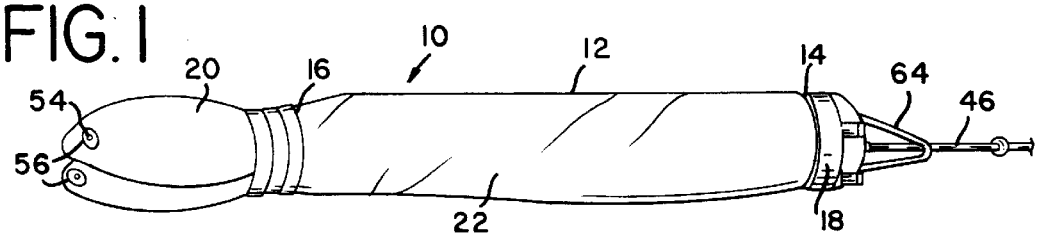
FIG. 1 is an elevational view of a liner installation device constructed in accordance with the principles of the present invention and used for performing spot repairs within pipelines.
Figure 1A:
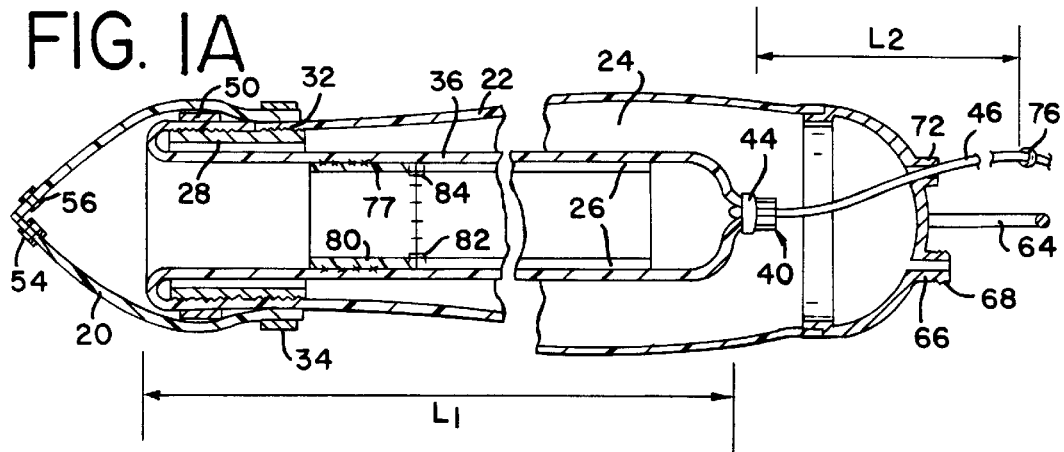
FIG. 1A is a cross-sectional view of the liner installation device of FIG. 1 illustrating the liner-bladder assembly in place within the liner installation device.

A pipe liner installation apparatus 10 constructed in accordance with the principles of the present invention is illustrated in FIG. 1. The apparatus 10 is seen to include an elongated carrier element 12, having two opposing ends 14, 16 interconnected by a body portion 15. One such end 14 includes an endcap member 18, while the other end 16 is open and includes one or more protective cover flaps 20. The body portion 15 includes an elongated tube or sleeve 22 formed from a durable and fluid-impervious material, suitable examples of which are heavy canvas, elastomeric-coated fabrics or the like. The sleeve 22 is hollow and has a generally tubular shape which defines an internal enclosure 24 of the carrier which receives a replacement pipe liner 26 therein and encloses or encapsulates the liner 26 to substantially prevent it from contacting the interior surface 101 of the pipe during insertion of the installation apparatus 10 into a pipe 100.

The forward, or open end 16, of the installation apparatus 10 includes an annular collar 28 fixed to the forward end of the sleeve 22. This collar member 28 provides a means for attaching an extension of the body portion 15, illustrated as a flexible inflation bladder 36, to the carrier body portion 15. In this regard, the collar member 28 may be provided with serrated or barbed projections on its outer surface 32 which readily engage the forward end of the sleeve 22. The connection between the sleeve and the collar member may also include an adhesive-based connection, utilizing a suitable adhesive, such as an epoxy, or may utilize durable tape 34, as illustrated. A mechanical connection in the form of a hose clamp may also be utilized. No matter what type of connection is effective between the collar member 28 and the sleeve 22, it is desirable to have the connection substantially fluid and air-tight, as will become evident.

The collar member 28 also provides a connection surface for the flexible inflation bladder 36 which provides a means of supporting the pipe liner 26 during installation. The inflation bladder 36 includes a hollow tubular sleeve 38 which is sealed at one end 40 thereof and which is opened at its opposing end 42. The seal at end 40 may be effected by the use of a ring member 44 which binds the bladder material together so as to form a seal. In such a seal, the ring 44 permits the passage of a bladder control cable 46 therethrough. The control cable 46 may include a plug member 47 disposed within the interior of the bladder 36 which engages the ring 44, or alternatively, the control cable 46 may be directly attached to the bladder material by suitable connection means. The control cable 46 and the bladder end 40 cooperate with other elements of the apparatus 10 to load the liner-bladder assembly 104 into the carrier element 12, to control and to limit the extent of displacement of the inflation bladder 36 out of the apparatus 10 and into place within the pipe 100 and to remove the inflation bladder 36 from the liner 26 after it has been cured.

Returning to the forward end 16 of the installation apparatus 10, the inflation bladder 36 is preferably connected to the sleeve 22 at the collar member 28 by means of a removable, circular clamping member, such as a hose clamp 50, which permits the inflation bladder 36 to be attached and removed from the apparatus 10 reliably and easily, and which forms a substantially fluid and air-tight seal between the bladder 36 and the carrier element 12. The forward end 16 may further include a plurality of protective cover flaps 20 which, as illustrated, may be formed separately from the sleeve 22 and applied to the body portion 15 of the apparatus 10 and affixed thereto by clamps or tape 52. Alternatively, it is contemplated that the protective cover flaps 20 may be formed integrally with the sleeve 22. The cover flaps 20 have a length which is sufficient which cover the open end 16 of the launching apparatus and the collar member 28.

Figure 4:
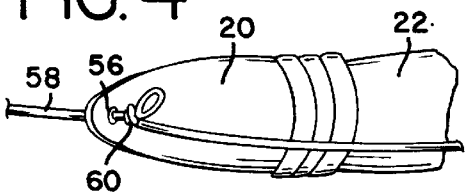
FIG. 4 is a perspective view of the forward end of the device of FIG. 1 illustrating how the protective flaps are tied together prior to insertion of the device into an existing pipeline.

The cover flaps 20 may further include openings 54, as illustrated, which may be reinforced with one or more grommets 56. These openings 54 receive a means for conveying the installation apparatus 10 through a pipe into position near a compromised pipe section, such as the rope 58 illustrated in FIG. 4. The conveyance rope 58 extends through the flap openings 54 and includes a knot 60, or other suitable stop member, which is larger than the openings 54 so that when the rope is pulled in the forward direction, (indicated by the arrow F) it engages the installation apparatus 10 at the cover flaps 20 thereof and pulls it forward to advance it through the pipe 100.

The apparatus 10 may also be conveyed through the pipe 100 rearwardly by a second conveying means, such as rope 62 which engages the closed rear end 14 of the installation apparatus 10. In this regard, the endcap 18 is provided with a hook member 64 welded to the metal endcap 18. This hook member 64 is utilized primarily for removing the apparatus 10 from the pipeline after the new liner 26 has been installed and cured, but may also be used for adjusting the position of the installation apparatus 10 with respect to the compromised section 102 of the pipe 100 because it permits the installer to move the installation apparatus 10 rearwardly, that is, in the direction opposite the arrow F.

Figure 3:
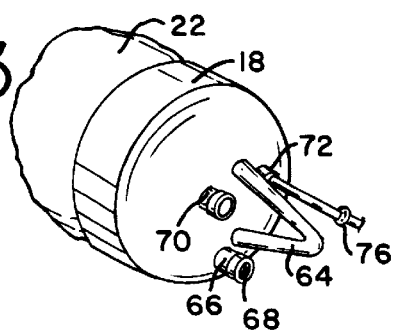
FIG. 3 is a perspective view of an endcap of the liner installation device of FIG. 1.

The endcap 18 also preferably includes one or more apertures, with three such apertures being illustrated in FIG. 3. The first aperture 66 includes a threaded end portion 68 which receives a connection for a fluid supply hose (not shown) and defines a port through which fluid, such as hot water or air, may be supplied to the apparatus 10 under pressure from an external pump (not shown). The second aperture 70 is similar to the first aperture 66 and also defines a port through which fluid may be evacuated from the installation apparatus 10.

The third and last aperture 72 receives the inflation bladder control cable 46 therethrough and provides an engagement surface 74 which engages a stop member 76 affixed to the cable 46 at a length $L_2$ between the inflation bladder sealed end 40 and the stop member 76 which is approximately equal to the working length $L_1$ of the inflation bladder 36. As will be appreciated, the control cable 46 and its associated stop member 76 may be used to limit the extent to which the inflation bladder 36 everts out of the launcher body portion 15 under pressure of fluid injected into the apparatus 10 through the aperture 66. The stop member 76 may be positioned on the cable 46 by the installer to regulate the extent of eversion of the inflation bladder 36. It will also be appreciated that the cable 46 and stop member 76 also provide a means for loading, or drawing in, the inflation bladder 36 into the interior enclosure 24 defined within the launcher body portion 15.

Figure 11:
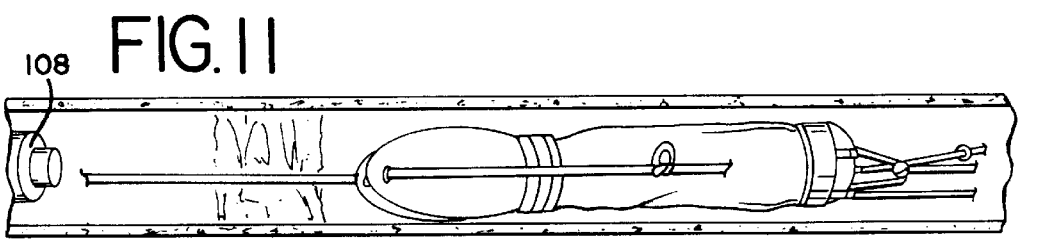
FIG. 11 is a view illustrating the step of removing the insertion rope from the installation device forward end to open the protective end flaps thereof.

The inflation bladder 36 defines a means for supporting a pipe liner 26 in place within the launching apparatus 10 and within the pipeline. (FIG. 11.) In order to properly position the liner 26 on the inflation bladder 36 and to prevent it from moving out of place during installation, the inflation bladder may be provided with an annular collar 77 affixed to the inflation bladder 36. The annular collar 77 is used to anchor the liner 26 to the inflation bladder 36 and the collar is suitably attached to the bladder 36 by, for example, plastics welding, heat welding, ultrasonic welding or an adhesive connection, to form a durable and substantially permanent attachment 78 to the bladder 36. This anchor collar 77 serves to anchor the liner 26 to the bladder 36 and to fix the position thereof with respect to the bladder so that during everting of the bladder 36 from the apparatus 10, the installer may be confident of the position of the rearmost end 26B of the liner with respect to the compromised pipe section, and ensure that the liner 26 contacts the pipe interior surface 101 at the compromised section 102.

Figure 2:
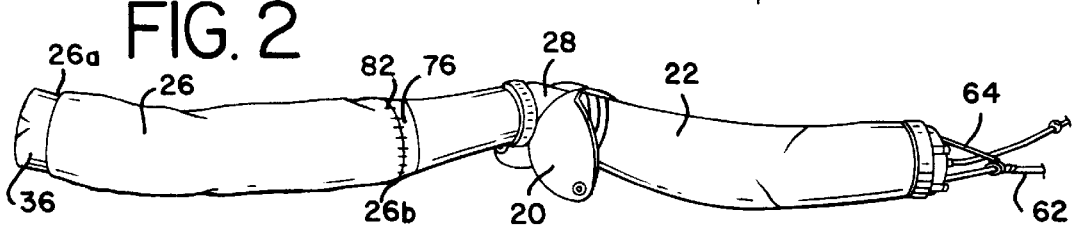
FIG. 2 is a perspective view of the liner installation device of FIG. 1 with the liner-bladder assembly everted out of the installation device illustrating the position of a pipe liner in place upon an internal inflation bladder.
Figure 5:
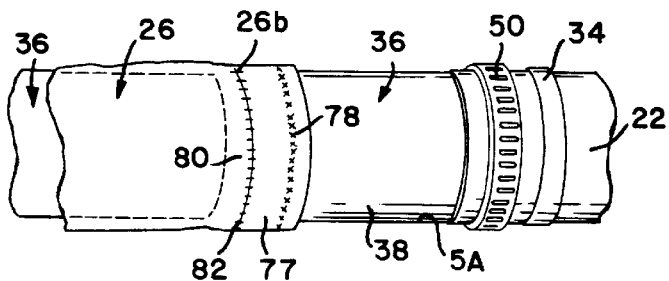
FIG. 5 is an enlarged view of the connection between the liner-bladder assembly and the installation device, including the frangible connection between the pipe liner and the inflation bladder.

The anchor collar 77 is of sufficient width to define an annular flap portion 80 (i.e., a portion which is not attached to the bladder 36 and which may be lifted away from the bladder) thereof to which the liner 26 is attached. The liner 26 is preferably attached to the anchor collar 77 in a manner to define a frangible connection 82 between the liner rear end 26b and the bladder anchor collar 77. As illustrated best in FIGS. 2 and 5, this frangible connection 82 is provided by sewing or stitching the two components together with a thread 84 having a strength sufficiently great to allow the bladder 36 to evert out of the installation apparatus 10 and the liner 26 therewith and into the pipeline, yet sufficiently weak enough to allow the thread to break when the liner 36 (and installation apparatus 10) are pulled rearwardly in the pipe 100 to free the inflation bladder 36 from the liner 26. Although this is one manner in which the connection 82 may fracture, it is not necessary that the threads break, because the bladder 36 may be formed from a material which will shear upon pressure by the threads 84.

Figure 5A:
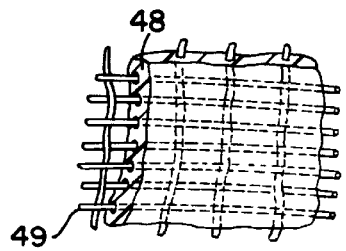
FIG. 5A is an enlarged view of a section of the bladder illustrating the preferred material of construction.
Figure 6:
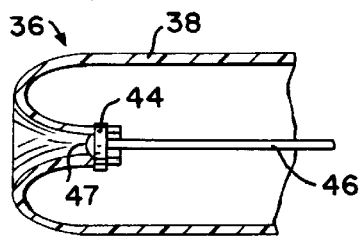
FIG. 6 is a cross-sectional view of the forward end of the inflation bladder everted out of the liner installation device illustrating how the inflation bladder is sealed.

One such bladder material which has given preferable results is a urethane scrim material which is a polymeric sheet having a very coarse and open weave embedded therein. (FIG. 5A) This urethane scrim includes a urethane base sheet, or stratum 48, having a coarse weave fabric, or scrim 49, embedded therein. The embedded scrim reinforces the urethane base sheet so that the expansion of the bladder 36 is controlled and so that no weak spots occur in urethane base sheet during expansion which may rupture. In this regard, the frangible connection may occur primarily in the anchor collar where the threads which hold the liner and anchor collar together cut through the anchor collar.

Although in this detailed description, the frangible connection 82 has been described in terms of a threaded connection between the anchor collar 77 and the liner 26, it will be understood that other suitable means of connecting these two components may be used and equivalent results and the advantages of the invention may be obtained therewith. Examples of such connections may include an adhesive connection or a heat welded connection, and, as such, the description of this threaded connection is not intended in any way to limit the scope of the present invention.

Installation of a Liner Using the Installation Apparatus

Figure 16:
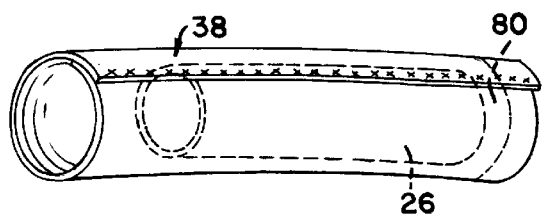
FIG. 16 illustrates the step of alternatively forming a liner-bladder assembly.

FIGS. 7–14 illustrate the installation of a new liner 26 into a pipe 100 at the compromised section 102 thereof using the carrier element 12 of the present invention. The length of the compromised pipe section 102 is first determined by inspection using a closed circuit remote controlled television ("CCTV") unit 108. The liner 26 is preferably formed from a tubular, seamless fabric sleeve having a diameter less than the diameter of the pipe 100. The liner 26 further has a length which is greater than the length of the compromised pipe section 102. The liner 26 typically is formed from a seamless fabric sleeve which is capable of a certain degree of radial expansion. It has been found that knitted pile liners give preferred results. The liner sleeve is generally tubular and has a central passage extending therethrough which receives the inflation bladder 36. The inflation bladder 36 may be formed into a tube by first selecting a sheet of the scrim and rolling it into a tube and subsequently sealing it, such as by heat or solvent welding along a longitudinal seam 39 as shown in FIG. 16.

The inflation bladder 36 is prepared selecting a tube of a flexible and expandable material, such as the urethane scrim described above. The diameter of the inflation bladder tube chosen is slightly less than the diameter of the pipe 100 and the length of the bladder is greater than that of the compromised pipe section to allow for the anchor and attachment portions of the bladder 36.

The bladder 36 is sealed at one end 40 and the bladder expansion control cable 46 is attached to the sealed end 40 and guided through its associated endcap aperture 72. The anchor collar 77 is prepared by selecting a strip of suitable material, preferably a polymeric material which may be adhesively attached or otherwise welded to the bladder outer surface, and having a width sufficient to define an attachment portion and an extending flap portion. When the anchor collar 77 is attached to the bladder 36, the bladder 36 may be drawn through the liner 26 and the rear end 26b of the liner 26 moved adjacent the flap portion 80 of the anchor collar 77. The liner 26 is attached to the anchor collar by sewing it to the flap portion (FIG. 8) to form a liner-bladder assembly 104.

The liner 26 may then be coated with a liquid resin in a manner to saturate or impregnate the fabric liner with the resin. Preferably, the resin is an epoxy resin, polyester resin or vinylester resin which cures into a solid upon application of heat or the passage of time. One epoxy resin which has been found to give desirable results in Aquata-poxy, manufactured by American Chemical Company of St. Louis, Mo.

Figure 8:
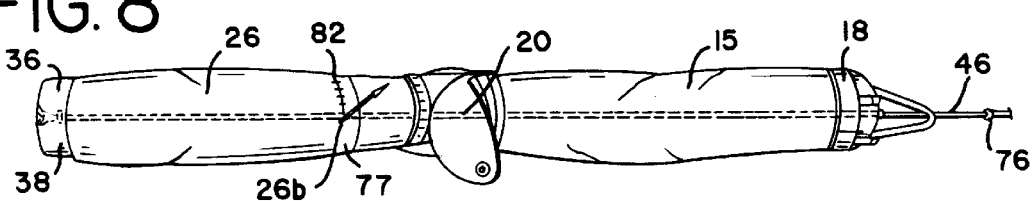
FIG. 8 illustrates one way of frangibly attaching the pipe liner to the inflation bladder anchor collar to form a liner-bladder assembly.
Figure 17:
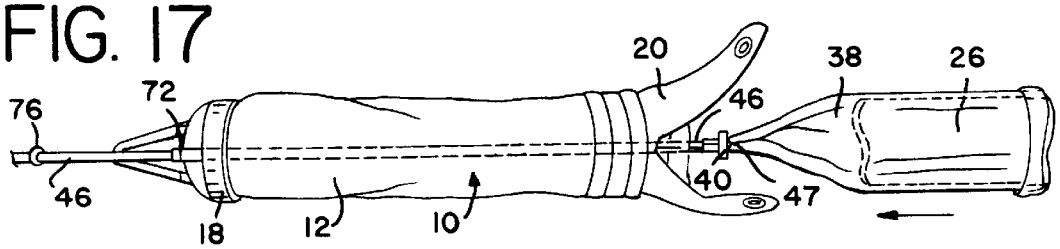
FIG. 17 illustrates an alternate step of enclosing the liner-bladder assembly into the liner installation device.

The resin may be applied to the liner 26 in different ways. The resin may be applied to the liner 26 such as by brushing it onto the liner after the liner has been attached to the inflation bladder 36, and the bladder is subsequently drawn into the carrier element 12 by inverting it as illustrated in FIG. 8. However, the method requires the installer to protect the surrounding environment from contact with the resin. A cleaner and similarly effective way is illustrated in FIGS. 15–17.

Figure 15:
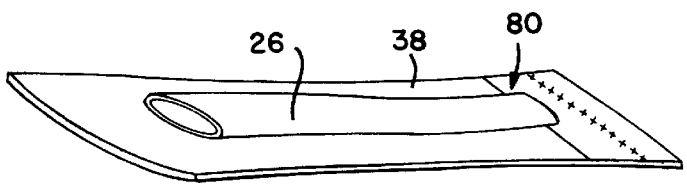
FIG. 15 illustrates the step of positioning the pipe liner on a sheet of scrim.

In this alternate fashion of impregnating the liner 26 with resin, the liner 26 is laid out upon a sheet of bladder material as shown in FIG. 15. The bladder material is rolled around the liner 26 to form a tube as illustrated in FIG. 16 and is welded together along the seam 39. The end 40 of the tube is sealed in the manner described above and the control cable 46 is attached thereto. The open end may be partially everted upon itself and the liner end 26b is sewn onto the bladder anchor collar 77 to form the frangible connection. The bladder may then be unrolled and resin may be introduced into the open end of the bladder 36. The liner-bladder assembly 104 may then be passed through a pair of rollers (similar to a wringer) in a manner well known in the art to squeeze the resin down the length of the liner 26 to fully saturate the liner 26. Alternatively, the resin may be introduced into the open end of the bladder 36 and a slit 41 may be made in the bladder near the sealed end 40 thereof and a vacuum pump 120 or hose introduced into the interior of the bladder to draw the resin through the bladder under a vacuum to impregnate the liner 26. In this method of resin impregnation, the resin is prevented by the bladder from contacting the installer or the surrounding environment.

Figure 9:
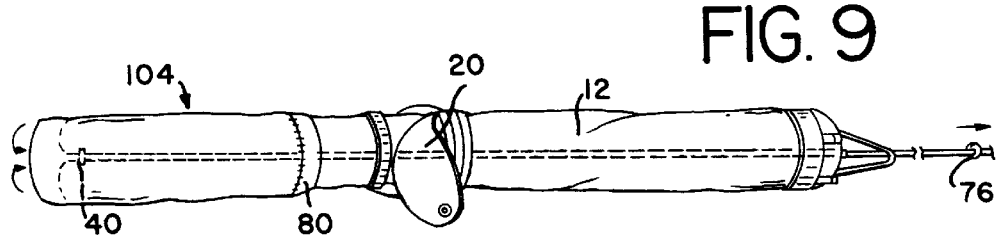
FIG. 9 illustrates one way of inverting the liner-bladder assembly into the liner installation device.
Figure 10:
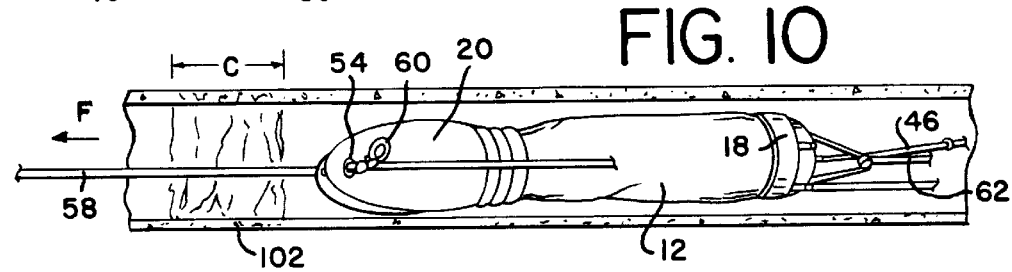
FIG. 10 illustrates the step of introducing the liner installation device into a pipeline and positioning it proximate to a compromised pipeline section.

Once the liner 26 has been impregnated with resin through any of the methods described above, the liner-bladder assembly 104 may be attached to the carrier element 12 by engaging the carrier element attachment collar 28 with the open end of the bladder 36 and securing it to the collar 28 with a suitable means, such as pipe clamp 50. In instances where the liner 26 has been impregnated with resin in an everted state such as shown in FIG. 8, the liner-bladder assembly 104 may then be inverted into the carrier element enclosure 24, as shown in FIG. 9 by pulling on the bladder control cable 46 so that the sealed end 40 of the bladder 36 is drawn inwardly into the carrier element 12 along with the rest of the liner.

Alternatively, in instances where the liner 26 has been impregnated with resin while enclosed within the inflation bladder 36 as illustrated in FIGS. 15 and 16, the liner-bladder assembly 104 is drawn into the carrier element 12 by pulling on the control cable 46 (FIG. 17) until the liner-bladder assembly 104 enters the carrier element enclosure 24, whereupon the open end of the bladder may then be attached to the carrier element attachment collar 28 as described above.

Figure 7:
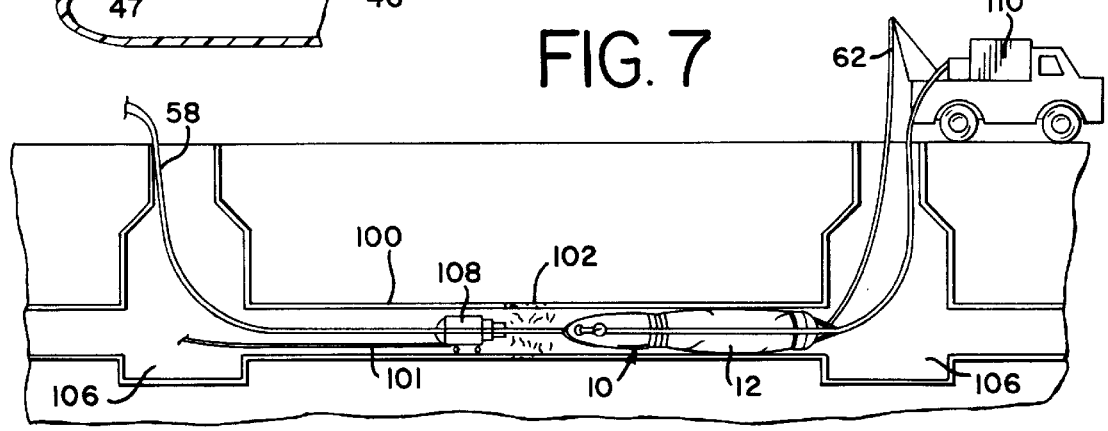
FIG. 7 is a schematic view illustrating the general environment in which the liner installation device is used in a method for lining a pipeline with a tubular material.

Once the liner-bladder assembly 104 has been assembled into the carrier element 12, the installation apparatus 10 is inserted into the pipe 100 at an accessway 106. (FIG. 7.) A conveying rope 58, which has been previously drawn through the pipe 100 between two accesways 106 thereof is threaded through the openings 54 in the carrier element cover flaps 20, and a stop, such as knot 60, is formed in the rope 58 rearward of the cover flap openings 54. The carrier element 12 is then pulled through the pipe 100 until it approaches the compromised pipe section 102. The location of the compromised pipe section 104 may be determined by the CCTV monitor 108 which preferably remains in the pipe 100 during installation of the liner 26.

The carrier element cover flaps 20 are then opened to permit the eversion of the liner-bladder assembly 104 by retrieving the conveying rope 58 as a result of pulling it rearwardly through the cover flap openings 54 as illustrated in FIG. 11. Fluid is thereupon introduced into the enclosure 24 of the carrier element 12 between the liner-bladder assembly 104 and the carrier element body portion 15 under pressure by way of a fluid supply hose attached to the endcap first aperture 66.

Figure 12:
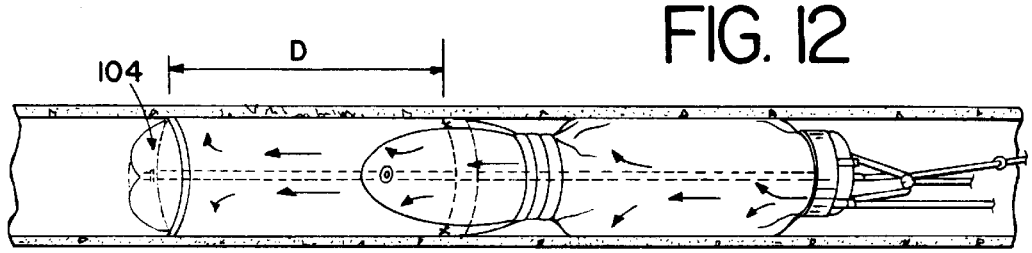
FIG. 12 is a view illustrating the step of introducing fluid under pressure into the liner installation device to evert the liner-bladder assembly out of it and into position within the pipeline.
Figure 13:
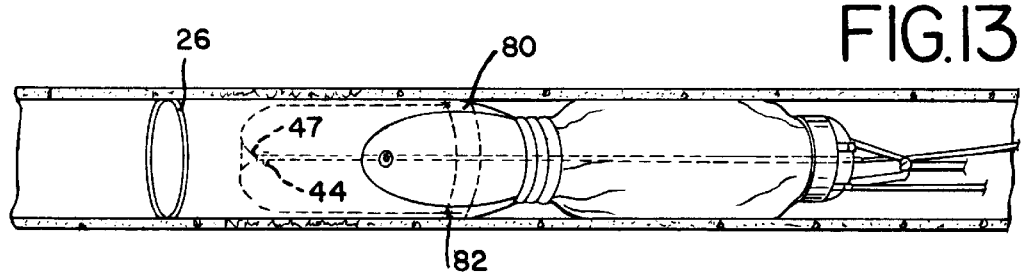
FIG. 13 is a view illustrating the step of reducing fluid pressure within the liner installation device to partially collapse the inflation bladder and withdrawing the inflation bladder from the liner.

As the fluid enters the enclosure 24, it causes the liner-bladder assembly 104 to evert out of the carrier element 12 in a manner such that the radial positions of the liner 26 and inflation bladder 36 are reversed, i.e., the liner 26 now lies on the outer radial surface of the bladder 36, while the bladder 36 occupies the inner radial surface of the liner-bladder assembly 104. (FIG. 12). As this eversion takes place, tension is applied to the bladder cable 46 in order to regulate the expansion of the liner-bladder assembly 104 out of the carrier element 12 at a substantially uniform rate. This tension ensures that the liner 26 (and bladder 36) will evert properly and expand against the pipe inner surface 101 uniformly in a manner which substantially prevents the formations of any wrinkles in the liner 26 (or in the bladder 36, which would result in reflective wrinkles being formed in the liner 26). This means for preventing the formation of wrinkles in the finished liner is important because of the elimination of such wrinkles, which present obstructions to the fluid flow within the pipe 100 and which may affect the design characteristics of the pipe 100.

The eversion and expansion of the liner-bladder assembly 104 occurs incrementally forwardly along the axis of the pipe 100 and in each increment of expansion, the liner-bladder assembly 104 everts forwardly and then expands radially outwardly. This expansion is further monitored by the CCTV monitor 108. The extent to which the liner-bladder assembly 104 may evert out of the carrier element 12 is controlled by the bladder cable 46. The cable stop member 76 will engage the seat of its guide aperture 72 in the endcap 18 when the liner-bladder assembly 104 has reached its maximum distance of eversion.

After the liner-bladder assembly 104 has been fully everted out of the carrier element 12, the resin is permitted to cure. In instances where a thermosetting resin is used to impregnate the liner 26, hot water or air is circulated through the liner-bladder assembly 104 by a circulator 110 and in instances where the resin is an ambient-cure resin, the liner-bladder assembly 104 is maintained in its inflated state for a predetermined amount of time corresponding at least to the cure time of the resin. Once the liner 26 has cured in place within the pipe 100, fluid is removed from the apparatus 10 by evacuating it through the fluid return aperture 70, reducing the fluid pressure inside of the liner-bladder assembly 104 and deflating it.

While the fluid evacuation may be taking place, the inflation bladder 36 is preferably withdrawn into the carrier element 12 by pulling on the bladder control cable 46. (FIG.

Figure 14:
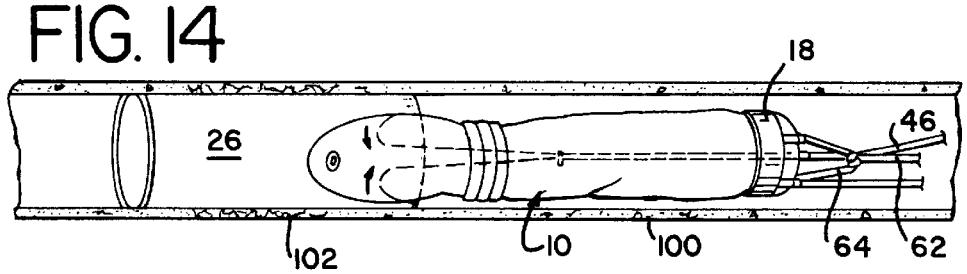
FIG. 14 is a view illustrating the steps of drawing the inflation bladder into the installation device, removing the installation device from its location in the pipe, and breaking the frangible connection between the liner and the inflation bladder.

13.) This withdrawal exerts a force on the frangible connection which exceeds either the breaking strength of the stitches 82 holding the liner 26 to the anchor collar 77 of the shear strength of the anchor collar material causing the frangible connection 82 to break and free the bladder 36 from the cured in place liner 26, thereby permitting withdrawal of the entire apparatus 10 from the pipe 100. The apparatus 10 is easily removed from the pipe 100 by pulling on the removal rope 62, as illustrated in FIG. 14.

It will be appreciated that the embodiments of the present invention which have been discussed are merely illustrative of some of the applications of this invention and that numerous modifications may be made by those skilled in the art without departing from the true spirit and scope of this invention.

We claim:

1. A method of lining the interior of a pipeline, comprising:

providing a pipe liner having a preselected length and diameter;

providing an elongated, inflation bladder, said inflation bladder having a preselected length greater than said pipe liner length;

forming a pipe liner assembly by frangibly attaching said pipe liner at one end thereof to a surface of said inflation bladder by way of a stitched connection, the stitched connection extending circumferentially around said inflation bladder;

providing a hollow, tubular carrier and attaching one end of said inflation bladder to said carrier;

impregnating said pipe liner with a curable resin to form a resin-impregnated pipe liner;

enclosing said liner assembly within carrier to protect said resin-impregnated pipe liner from contact with the interior of said pipeline;

introducing said carrier into said pipeline and urging said liner assembly out of said carrier into said pipeline by applying fluid pressure to said carrier, whereby said pipe liner assembly exfoliates out of said carrier and attains a position within said pipeline wherein said resin-impregnated pipe liner opposes and contacts said pipeline interior;

allowing said resin to cure, whereby said pipe liner forms a new interior lining of said pipeline; and, removing said carrier from said pipeline by breaking said stitched connection between said resin-impregnated pipe liner and said inflation bladder.

2. A method according to claim 1, wherein said inflation bladder is formed from a flexible polymeric material having a scrim embedded therein.

3. A method according to claim 1, wherein said inflation bladder is formed from a flexible polymeric material which extends axially outwardly from said carrier when said liner assembly exfoliates out of said carrier, the inflation bladder having a scrim embedded therein, said inflation bladder having an anchor point for said stitched connection, said resin-impregnated pipe liner being attached to said inflation bladder at said anchor point.

4. A method according to claim 3, further including:

expanding said pipe liner against said pipeline interior by introducing fluid into said carrier until said fluid reaches a predetermined pressure at which said pipe liner intimately contacts said pipeline interior;

maintaining said fluid within carrier at said predetermined pressure until said resin cures; and, removing at least a portion of said fluid from said carrier in order to relieve said pressure of said fluid within said extension member to permit said inflation bladder to be drawn back into said carrier.

5. The method of claim 1, wherein said pipe liner lies adjacent to and over an extension surface of said inflation bladder.

6. The method of claim 5, wherein said pipe liner is frangibly attached to said inflation bladder at a location thereon that is spaced apart a preselected distance from said inflation bladder one end so that when said pipe liner assembly exfoliates out of said carrier element open end, said pipe liner is spaced away from said carrier element open end.

7. A method of lining the interior of a pipeline comprising the steps of:

providing an elongated hollow carrier element having at least one open end;

forming an elongated tubular inflation bladder;

applying a tubular lining material to a first preselected surface of the inflation bladder to form a liner-bladder assembly so that the lining material lies adjacent said inflation bladder;

forming a frangible connection between the lining material and said inflation bladder at an attachment location toward a common end thereof by circumferentially stitching said lining material to said inflation bladder;

attaching an end of said liner-bladder assembly to an open end of said carrier element;

applying a curable resin to said lining material;

placing said liner-bladder assembly inside of said carrier element so that said inflation bladder lies radially inwardly of said carrier element and said lining materials lies radially inwardly of said inflation bladder;

inserting said carrier element into the pipeline;

everting said liner bladder assembly out of said carrier element under fluid pressure so that said lining material lies radially outwardly of and adjacent said inflation bladder first preselected surface in opposition to the interior said pipeline and said attachment location lies outside of said carrier;

permitting said resin to cure to form a new interior lining within said pipeline; and, removing said inflation bladder and carrier element from said pipeline by exerting a force upon said inflation bladder so as to break said frangible connection between said inflation bladder and said lining material.

8. The method of claim 7, further including the steps of forming a frangible connection between said lining material and said inflation bladder prior to insertion of said carrier element into said pipeline, and breaking said frangible connection prior to removing said inflation bladder and said carrier element from said pipeline.

9. The method of claim 7, wherein said resin is a polyester resin, vinylester resin or epoxy resin.

10. The method of claim 7, wherein said tubular lining material is a seamless fabric sleeve.

11. The method of claim 7, further including the step of forming a collar portion on said inflation bladder near said attachment location and forming said stitched connection between said lining material and said collar portion.

12. The method of claim 7, wherein said carrier element includes an endcap having a least one aperture formed therein, and an inflation bladder expansion control cable extending through said endcap aperture, said expansion control cable having a stop member disposed thereon which is adapted to engage an opposing stop surface of said endcap aperture to limit the extent of eversion of said inflation bladder out of said carrier element.

13. The method of claim 12, wherein one end of said inflation bladder control cable engages an end of said inflation bladder and said stop member is disposed on said inflation bladder control cable a distance from said inflation bladder end which is greater than a length of said inflation bladder.

14. The method of claim 7, wherein said inflation bladder is formed from a urethane scrim.

15. The method of claim 7, including the step of:

controlling the eversion of said liner-bladder assembly out of said carrier element by applying a restraining force to said liner-bladder assembly during everting of same.

16. The method of claim 15, including the step of:

providing an elongated inflation bladder eversion control cable and extending the cable through one end of said carrier element and attaching the inflation bladder eversion control cable to said liner-bladder assembly at an end opposite from said attachment location; and, applying said restraining force to said liner-bladder assembly during everting of same by applying tension to said inflation bladder eversion control in order to regulate eversion of said liner-bladder assembly out of said carrier element.

\* \* \* \* \*